US009994322B2

(12) United States Patent
Bruno et al.

(10) Patent No.: US 9,994,322 B2
(45) Date of Patent: Jun. 12, 2018

(54) ENVIRONMENTAL CONTROL SYSTEM UTILIZING PARALLEL RAM HEAT EXCHANGERS

(71) Applicant: Hamilton Sundstrand Corporation, Windsor Locks, CT (US)

(72) Inventors: Louis J. Bruno, Ellington, CT (US); Donald E. Army, Jr., Enfield, CT (US); Thomas M. Zywiak, Suffield, CT (US); Erin G. Kline, Vernon, CT (US); Christina W. Millot, Wilbraham, MA (US); Harold W. Hipsky, Willington, CT (US); Paul M. D'Orlando, Simsbury, CT (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 389 days.

(21) Appl. No.: 14/619,632

(22) Filed: Feb. 11, 2015

(65) Prior Publication Data
US 2016/0229542 A1 Aug. 11, 2016

(51) Int. Cl.
*B64D 13/08* (2006.01)
*B64D 13/06* (2006.01)

(52) U.S. Cl.
CPC ............. *B64D 13/08* (2013.01); *B64D 13/06* (2013.01); *B64D 2013/0603* (2013.01); *B64D 2013/0618* (2013.01); *Y02T 50/56* (2013.01)

(58) Field of Classification Search
CPC ........ B64D 13/00; B64D 13/02; B64D 13/06; B64D 13/08; B64D 2013/0603; B64D 2013/0618; F28D 15/00; F25D 9/00; F28F 27/00; F28F 27/02; F02C 6/06; F02C 9/18; F02C 9/50; F02C 9/52; Y02T 50/56
USPC .......... 165/96, 100, 101, 86, 87, 88; 62/401, 62/402, 172, 244
See application file for complete search history.

(56) References Cited

U.S. PATENT DOCUMENTS 2,963,879 A * 12/1960 De Paravicini ........ B64D 13/08
62/197
4,262,495 A * 4/1981 Gupta .................... B64D 13/06
62/172

(Continued)

FOREIGN PATENT DOCUMENTS

EP 1329380 A1 7/2003
EP 1439123 A2 7/2004
(Continued)

OTHER PUBLICATIONS

Machine Translation JP 09318206 A.*
(Continued)

*Primary Examiner* — Keith Raymond
*Assistant Examiner* — Gustavo Hincapie Serna
(74) *Attorney, Agent, or Firm* — Cantor Colburn LLP

(57) ABSTRACT

A system, which includes a plurality of heat exchangers and a compressing device, is configured to prepare in parallel a medium bled from a low-pressure location of an engine and flowing through a plurality of heat exchangers into a chamber. The compressing device is in communication with the plurality of heat exchangers and regulates a pressure of the medium flowing through the plurality of heat exchangers.

5 Claims, 3 Drawing Sheets

(56) References Cited

U.S. PATENT DOCUMENTS

| | | | | |
|---|---|---|---|---|
| 5,323,624 A * | 6/1994 | Schwalm | ............... | B64D 13/06 62/401 |
| 5,461,882 A * | 10/1995 | Zywiak | ............. | B60H 1/00007 62/401 |
| 5,704,218 A * | 1/1998 | Christians | .............. | B64D 13/06 62/172 |
| 6,128,909 A * | 10/2000 | Jonqueres | .............. | B64D 13/06 62/402 |
| 6,148,622 A * | 11/2000 | Sanger | .................. | B64D 13/06 62/402 |
| 6,257,003 B1 * | 7/2001 | Hipsky | .................. | B64D 13/06 62/402 |
| 6,634,596 B2 | 10/2003 | Albero et al. | | |
| 6,729,359 B2 * | 5/2004 | Jones | .................... | B64D 13/08 141/1 |
| 6,845,630 B2 | 1/2005 | Bruno et al. | | |
| 6,948,325 B1 | 9/2005 | Axe et al. | | |
| 7,171,819 B2 * | 2/2007 | Lui | ........................ | B64D 13/06 454/71 |
| 7,845,188 B2 * | 12/2010 | Brutscher | ................. | B64D 37/32 244/53 R |
| 8,206,088 B1 * | 6/2012 | Plattner | .................. | B64D 13/06 415/143 |
| 8,266,888 B2 * | 9/2012 | Liu | ........................... | F02C 6/08 60/226.1 |
| 8,839,641 B1 * | 9/2014 | Plattner | .................. | B64D 13/06 62/401 |
| 2002/0121103 A1 * | 9/2002 | Udobot | .................. | B64D 13/06 62/402 |
| 2005/0011217 A1 | 1/2005 | Brutscher et al. | | |
| 2007/0119584 A1 * | 5/2007 | Scherer | .................. | B64D 13/00 165/203 |
| 2007/0144726 A1 * | 6/2007 | Scherer | .................. | B64D 13/00 165/203 |
| 2008/0242209 A1 | 10/2008 | Steinmaier et al. | | |
| 2008/0264084 A1 | 10/2008 | Derouineau et al. | | |
| 2009/0084122 A1 * | 4/2009 | Casado Montero | ... | B64D 13/08 62/244 |
| 2009/0291625 A1 | 11/2009 | Klimpel et al. | | |
| 2010/0323601 A1 | 12/2010 | Cremers et al. | | |
| 2013/0098092 A1 * | 4/2013 | Wakamoto | ................ | F25B 1/10 62/278 |
| 2013/0240144 A1 * | 9/2013 | Buchberger | ...... | H01J 37/32522 156/345.27 |
| 2013/0277009 A1 | 10/2013 | Army | | |
| 2015/0065025 A1 | 3/2015 | Bruno et al. | | |
| 2015/0121909 A1 * | 5/2015 | Koenig | .................. | B64D 13/06 62/61 |
| 2015/0337730 A1 * | 11/2015 | Kupiszewski | ............ | F02C 3/22 60/39.465 |

FOREIGN PATENT DOCUMENTS

| | | | |
|---|---|---|---|
| EP | 1457420 A1 | 9/2004 | |
| EP | 1857361 A2 | 11/2007 | |
| EP | 2845804 A1 | 3/2015 | |
| JP | 09318206 A * | 12/1997 | ............. F25B 47/02 |

OTHER PUBLICATIONS

Extended European Search Report for Application No. 16155275.7 dated Jul. 5, 2016; 7 pgs.

EP SR, dated Nov. 11, 2016, U310612EP.

Non-Final Office Action issued in U.S. Appl. No. 14/732,157, dated Apr. 5, 2017, 10 pages.

* cited by examiner

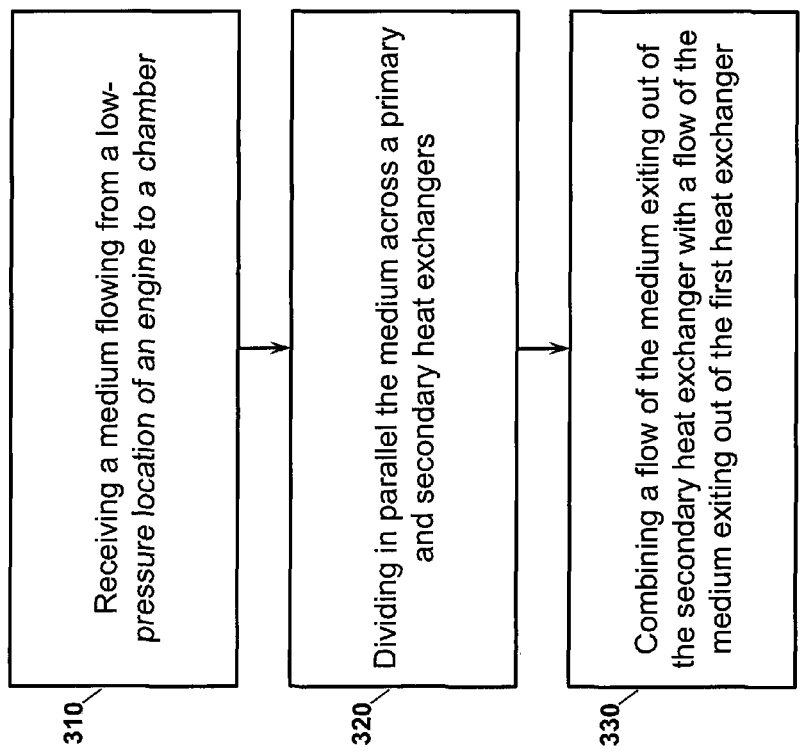

ENVIRONMENTAL CONTROL SYSTEM UTILIZING PARALLEL RAM HEAT EXCHANGERS

BACKGROUND OF THE INVENTION

In general, with respect to present air conditioning systems of aircraft, cabin pressurization and cooling is powered by engine bleed pressures at cruise. For example, pressurized air from an engine of the aircraft is provided to a cabin through a series of systems that alter the temperatures and pressures of the pressurized air. To power this preparation of the pressurized air, the only source of energy is the pressure of the air itself. As a result, the present air conditioning systems have always required relatively high pressures at cruise. Unfortunately, in view of an overarching trend in the aerospace industry towards more efficient aircraft, the relatively high pressures provide limited efficiency with respect to engine fuel burn.

BRIEF DESCRIPTION OF THE INVENTION

According to one embodiment, a system comprises a medium flowing from a low-pressure location of an engine to a chamber; a plurality of heat exchangers; a valve located upstream from the plurality of heat exchangers, the valve configure to divide in parallel the medium across at least a first heat exchanger and a second heat exchanger of the plurality of heat exchangers.

According to another embodiment, a method comprises receiving, by a first valve, a medium flowing from a low-pressure location of an engine to a chamber; dividing in parallel, by the first valve located upstream from a plurality of heat exchangers, the medium across at least a first heat exchanger and a second heat exchanger of the plurality of heat exchangers; and combining, by a second valve, a flow of the medium exiting out of the secondary heat exchanger with a flow of the medium exiting out of the first heat exchanger.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

FIG. 3 is example of process flow an environmental control system according to an embodiment.

DETAILED DESCRIPTION OF THE INVENTION

A detailed description of one or more embodiments of the disclosed apparatus and method are presented herein by way of exemplification and not limitation with reference to the Figures.

As indicated above, the relatively high pressures provide limited efficiency with respect to engine fuel burn. Thus, what is needed is an environmental control system that provides a medium in parallel across a plurality of heat exchangers to, thus, provide cabin pressurization and cooling at a high engine fuel burn efficiency.

In general, embodiments of the present invention disclosed herein may include a system comprising a plurality of heat exchangers and a medium flowing through the plurality of heat exchangers, wherein the medium is bled from a low-pressure location of an engine through the plurality of heat exchangers in parallel into a chamber. The low-pressure location of the engine provides the medium at an initial pressure level near a pressure of the medium once it is in the chamber (e.g., chamber pressure). In contrast, conventional systems utilize an initial pressure level that is much greater that the pressure chamber. For example, if a desired chamber pressure is 5 psia, conventional systems will bleed air from a higher pressure location of the engine that provides an initial pressure level at three times the chamber pressure (e.g., 15 psia). Further, the pressure of the medium at the low-pressure location may be slightly above or slightly below the chamber pressure (e.g., any value along the range of 4 to 7 psia when the chamber pressure is 5 psia).

Bleeding the medium at such a low pressure from the low-pressure location causes less of a fuel burn than bleeding air from a higher pressure location. Yet, because the medium is starting at this relatively low initial pressure level and because a drop in pressure occurs over the plurality of heat exchangers, the medium will drop below the chamber pressure while the medium is flowing through the plurality of heat exchangers. When the pressure of the medium is below the pressure of the chamber the medium will not flow into the chamber to provide pressurization and temperature conditioning. Thus, the system splits a flow of the medium into pieces so that the medium can go into at least two heat exchangers in parallel to, thus, allow for connecting to the low-pressure location.

Figure 1:
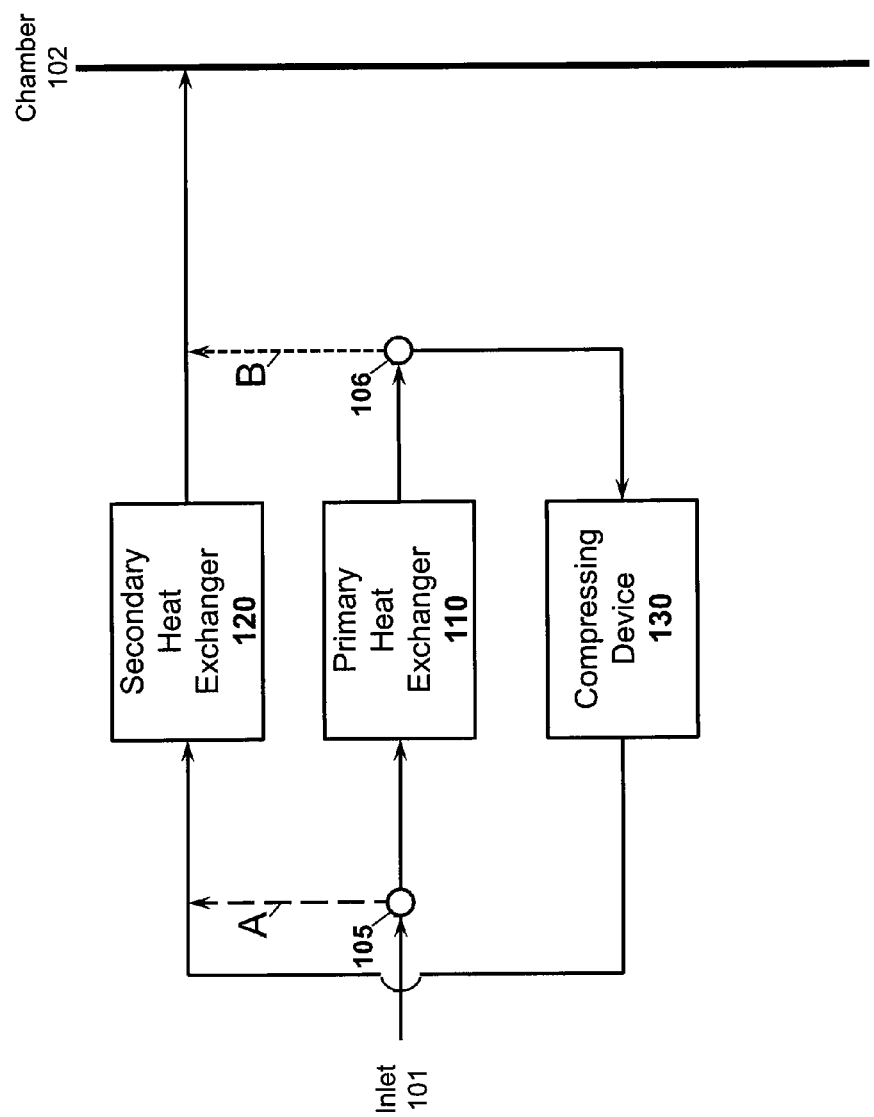
FIG. 1 is a diagram of an schematic of an environmental control system according to an embodiment.

FIG. 1 illustrates a system 100 with a medium (e.g., air) flowing from an inlet 101 to a chamber 102 though valves 105, 106, a primary heat exchanger 110, a secondary heat exchanger 120, and a compressing device 130.

In general, the system 100 supplies a medium to any environment (e.g., chamber 102), thereby providing regulation and/or monitoring of that environment. In one embodiment, the system 100 is any environmental control system of a vehicle, such as an aircraft, that provides air supply, thermal control, and cabin pressurization for a crew and passengers of the aircraft. Environmental control systems may also include avionics cooling, smoke detection, and/or fire suppression. Further, with respect to the aircraft example, the system 100 supplies pressurized air (e.g., a medium) to a flight deck of the aircraft (e.g., the chamber 102), for both comfort and pressurization. The air is supplied to the system 100 at inlet 101 by being "bled" from a compressor stage of an aircraft engine and/or directly from exterior air (e.g., via a ram air system). The temperature and pressure of this "bleed air" varies widely depending upon which compressor stage and a revolutions per minute of the aircraft engine. To achieve the desired temperature, the bleed air is cooled as it is passed through the heat exchangers 110, 120. To achieve the desired pressure, the bleed air is compressed as it is passed through the device 130. Note that the interaction of the system 100 with the aircraft engine influences how much fuel burn by the aircraft engine is needed to perform operations, such as supplying pressurized air, related to that interaction.

Valves, such as valves 105, 106, are devices that regulate, direct, and/or control a flow of a medium (e.g., gases, liquids, fluidized solids, or slurries, such as bleed air) by opening, closing, or partially obstructing various passageways within the tubes, pipes, etc. of the system 100. Valves may be operated by actuators such that the flow rates of any medium in any portion of the system 100 may be regulated to a desired value. For example, the valve 105 enables a flow of the medium from inlet 101 to be divided across the primary heat exchanger 110 and the secondary heat exchanger 120. Further, the valve 106 enables a flow of the medium from the primary heat exchanger 110 to be sent to the compressing device 130 and/or chamber 102.

Heat exchangers (e.g., the primary heat exchanger 110 and the secondary heat exchanger 120) are equipment built for efficient heat transfer from one medium to another. Examples of heat exchangers include double pipe, shell and tube, plate, plate and shell, adiabatic wheel, plate fin, pillow plate, and fluid heat exchangers. Continuing with the aircraft example above, air forced by a fan (e.g., via push or pull methods) and/or rammed during flight is blown across the heat exchanger at a variable cooling airflow to control the final air temperature of the bleed air.

The compressing device 130 (e.g., an air cycle machine as described below) is a mechanical device that regulates a pressure of a medium (e.g., increasing the pressure of a gas). Examples of a compressor include centrifugal, diagonal or mixed-flow, axial-flow, reciprocating, ionic liquid piston, rotary screw, rotary vane, scroll, diaphragm, air bubble compressors. Further, compressors are typically driven by an electric motor or a steam or a gas turbine.

In one operation, the system 100 can bypass the compressing device 130 by activating the valve 106 to divide the flow of the medium from inlet 101 into the primary heat exchanger 110 and the secondary heat exchanger 120 (e.g., arrow A). Both heat exchangers, in turn, cool their respective portions of the medium. Then, the flow of the medium exiting out of the secondary heat exchanger 120 is combined through the activation of valve 106 with flow of the medium exiting out of the primary heat exchanger 110 (e.g., arrow B). This operation may be called a heat exchanger cooling mode that lowers the pressure of the medium near that of the chamber pressure.

Figure 2:
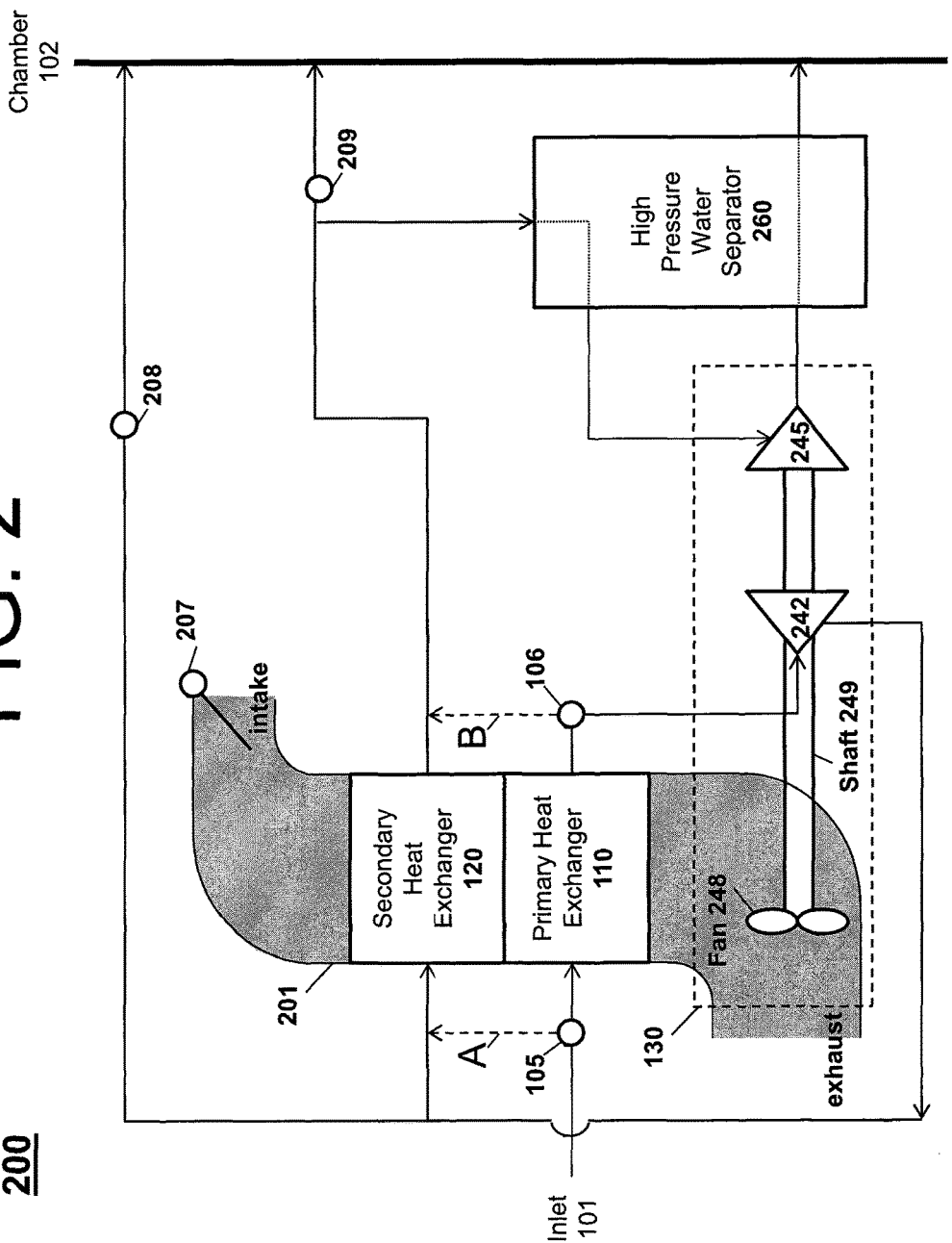
FIG. 2 is operation example of an environmental control system according to an embodiment.

The system 100 of FIG. 1 will now be described with reference to FIG. 2, in view of the aircraft example above. FIG. 2 illustrates an environmental control system 200 (e.g., an embodiment of system 100) that includes, in additional to the previously described items of FIG. 1, a shell 201, valves 207, 208, 209, the compressing device 130 (that includes a compressor 242, a turbine 245, a fan 248, and a shaft 249), and a high pressure water separator 260, each of which are connected via tubes, pipes, ducts and the like, such that bleed air is accepted at the inlet 101 (e.g., high- or low-pressure location of an engine of an aircraft) and provided to the chamber 102 (e.g., cabin, flight deck, etc.).

The environmental control system 200 is an example of an environmental control system of an aircraft that provides air supply, thermal control, and cabin pressurization for the crew and passengers of the aircraft. The shell 201 is an example of a ram chamber of a ram system which uses dynamic air pressure created by an aircraft in motion to increase a static air pressure inside of the shell. Valves 207, 208, 209 are examples of valves described above.

The compressing device 130 can be an air cycle machine that regulates a pressure of a medium (e.g., increasing the pressure of a bleed air). The turbine 245 is a mechanical device that drives the compressor 242 and fan 248 via the shaft 249. The compressor 242 is a mechanical device that compresses the bleed air received from a first heat exchanger (e.g., the primary heat exchanger 110). The fan 248 is a mechanical device that forces via push or pull methods air through the shell 201 across the heat exchangers at a variable cooling airflow. The compressor 242, the turbine 245, and the fan 248 together regulate pressure and illustrate, for example, that the air cycle machine (e.g., the compressing device 130) may operate as a three-wheel air cycle machine. In turn, the three-wheel air cycle machine may include addition of components, such as a power turbine that utilizes exhaust from the chamber 102 to provide additional power to the compressing device 130.

The high pressure water separator 260 is a mechanical device that performs operation of a heat exchanger described above and/or a process of removing water from the bleed air, either temporarily or permanently.

In one operation, bleed air is accepted at inlet 101 from a high-pressure location of an engine of an aircraft at an initial flow rate, pressure (e.g., 35 psia), and temperature that is much greater a final flow rate, pressure (e.g., 12 psia), and temperature. The bleed air is fed through the primary heat exchanger 110, which through cooling lowers the temperature to the compressor 242, which then raises the pressure. Then, due to the valves 208, 209 being closed the bleed air is fed through the secondary heat exchanger 120, which also through cooling lowers the temperature to the high pressure water separator 260.

In another operation, a cooling mode operation may be performed by the environmental control system 200. The cooling mode operation will now be described with respect to FIG. 3. FIG. 3 illustrates a process flow 300 that begins at block 310 where the bleed air is accepted at inlet 101 from a low-pressure location of an engine of an aircraft at an initial flow rate, pressure (e.g., 13 psia), and temperature that is near a final flow rate, pressure, and temperature. Then, at block 320, due to the activation of the valves 105, 106, the bleed air is divided across both the primary heat exchanger 110 and the secondary heat exchanger 120 (e.g., in parallel), such that a first temperature of the bleed air at the valve 105 is collectively reduced to a second temperature that can be at or near a temperature of the chamber 102. That is, the environmental control system 200 can bypass the compressing device 130 by activating the valve 106 to divide a flow of the bleed from inlet 101 into the primary heat exchanger 110 and the secondary heat exchanger 120 (e.g., arrow A). Both heat exchangers, in turn, cool their respective portions of the bleed. Then, at block 330, a flow of the bleed air exiting out of the secondary heat exchanger 120 is combined through the activation of valve 106 with a flow of the bleed exiting out of the primary heat exchanger 110 (e.g., arrow B). In general, the cooling mode operation may be called a heat exchanger cooling mode that lowers the temperature of the bleed air to a temperature required by the chamber. The cooling mode operation may be utilized when ram air cooling for the heat exchangers 110, 120 is adequate (e.g., ram air provides sufficient energy to the heat exchangers 110, 120 to reduce the temperature of the bleed air) and the pressure of the bleed air is high enough to maintain a pressure through the environmental control system 200 without the compressing device 130.

Aspects of the present invention are described herein with reference to flowchart illustrations, schematics, and/or block diagrams of methods, apparatus, and/or systems according to embodiments of the invention. Further, the descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A system, comprising:
    a medium flowing from a low-pressure location of an engine to a chamber;
    a plurality of heat exchangers;
    a valve located upstream from the plurality of heat exchangers, the valve configure to divide in parallel the medium across at least a first heat exchanger and a second heat exchanger of the plurality of heat exchangers,
    wherein the system operates in a heat exchanger cooling mode that lowers a pressure of the medium near that of a chamber pressure by combining a flow of the medium exiting out of the secondary heat exchanger and a flow of the medium exiting out of the first heat exchanger through an activation of a second valve that forwards the flow of the medium exiting out of the first heat exchanger; and
    a compressing device, in communication with the plurality of heat exchangers, configured to regulate a pressure of the medium,
    wherein the medium bypasses the compressing device when the valve divides in parallel the medium across at least the first heat exchanger and the second heat exchanger.

2. The system of claim 1, wherein a first temperature of the medium at the valve is reduced when the medium flows across the first heat exchanger and the second heat exchanger in parallel to a second temperature.

3. The system of claim 2, wherein ram air cooling provides sufficient energy to the plurality of heat exchangers to reduce the first temperature to the second temperature.

4. The system of claim 1, wherein a pressure of the medium at the low-pressure location of an engine is slightly above the chamber pressure.

5. The system of claim 1, wherein the system is an environmental control system of an aircraft,
    wherein the medium is air bled from an engine of the aircraft, and
    wherein the chamber is a cabin of the aircraft.

\* \* \* \* \*